United States Patent [19]

Giebel et al.

[11] 4,103,911
[45] Aug. 1, 1978

[54] SEALING MEMBER FOR CABLE INLETS

[75] Inventors: Wolfgang Giebel; Herbert Krause, both of Munich, Germany

[73] Assignee: Siemens Aktiengesellschaft, Berlin and Munich, Germany

[21] Appl. No.: 783,752

[22] Filed: Apr. 1, 1977

Related U.S. Application Data

[63] Continuation-in-part of Ser. No. 584,522, Jun. 6, 1975, abandoned.

[51] Int. Cl.² .................... H02G 15/24; H02G 15/18
[52] U.S. Cl. .............................. 277/210; 174/21 R; 174/77 R
[58] Field of Search ............... 277/209, 210, 200, 921; 174/93, 65 G, 77 R, 21 R

[56] References Cited

U.S. PATENT DOCUMENTS

| | | | |
|---|---|---|---|
| 3,104,884 | 9/1963 | Kerlin | 277/209 |
| 3,137,764 | 6/1964 | Gunthel et al. | 174/93 |
| 3,154,310 | 10/1964 | Hamano | 277/209 |
| 3,337,681 | 8/1967 | Smith | 174/93 |
| 3,594,696 | 7/1971 | Witek | 277/208 |
| 3,827,704 | 8/1974 | Gillemot et al. | 174/93 |
| 3,891,790 | 6/1975 | Kierstead | 174/93 |

Primary Examiner—Robert I. Smith
Attorney, Agent, or Firm—Hill, Gross, Simpson, Van Santen, Steadman, Chiara & Simpson

[57] ABSTRACT

A sealing member for effecting a gas-tight closure about a cable at an inlet to a hollow cable sleeve fitting. The member is annular in form and is divided on a plane parallel to the cable axis for assembly about the cable after boring a selected passage for the cable through the member. The sealing member has a plurality of radially- and circumferentially-continuous, radially outwardly-extending, longitudinally-spaced ribs engageable via a coating of plastic potting compound with an inner surface of the inlet fitting. The ribs are held in spaced relation by an integral reinforcement member which is spaced radially inwardly of the outer circumference of the ribs. A center portion of the reinforcement member is apertured so that selective boring through of the member to form a cable passage will leave internal radial ribs for bearing against the cable via a second plastic potting compound. Any number and size of cable passages may be provided for.

11 Claims, 6 Drawing Figures

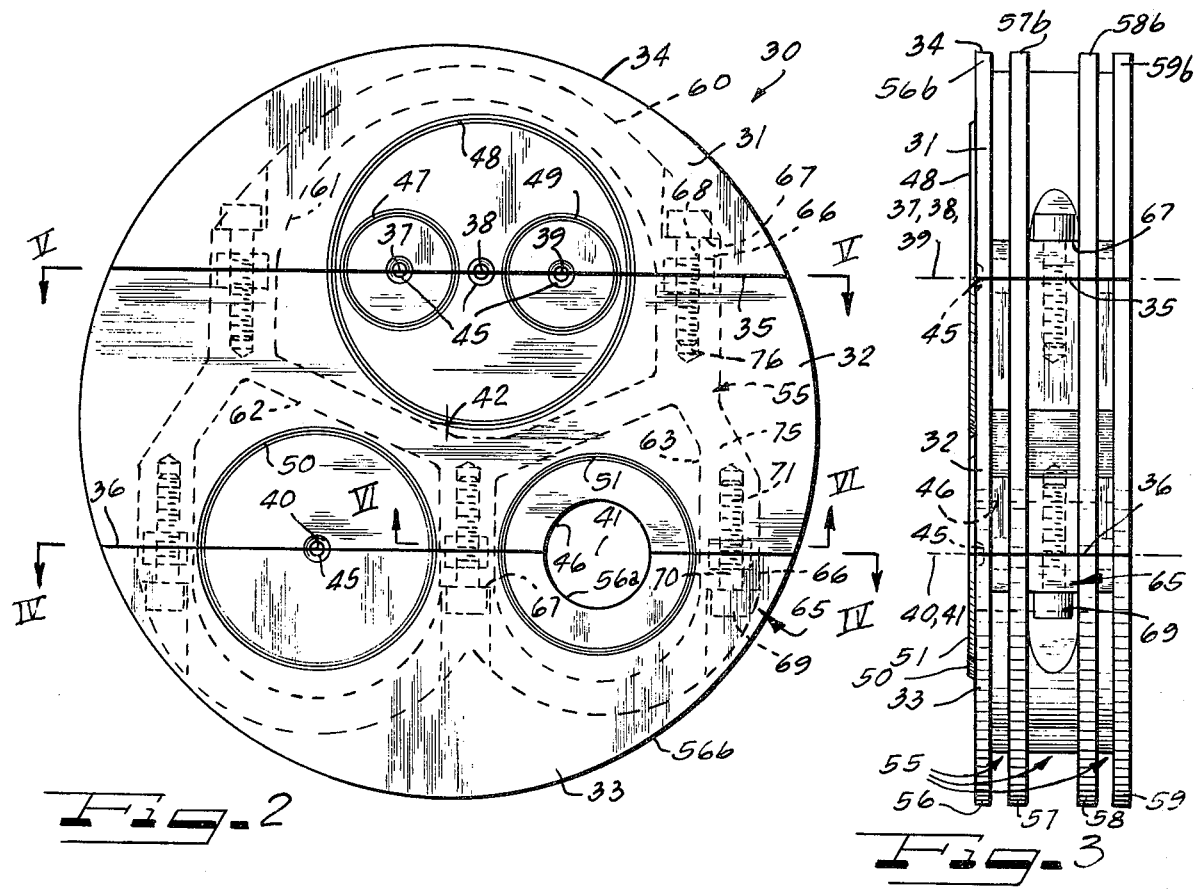
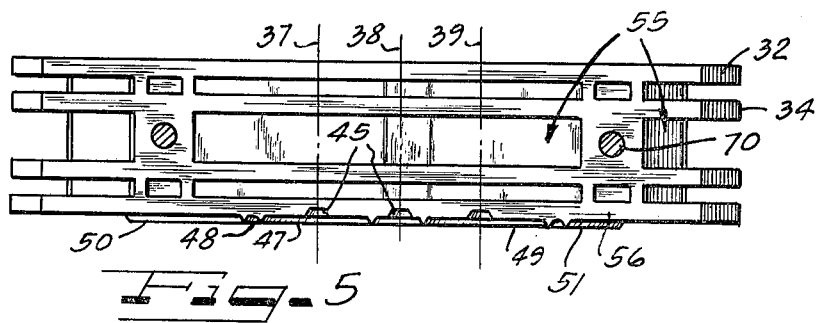
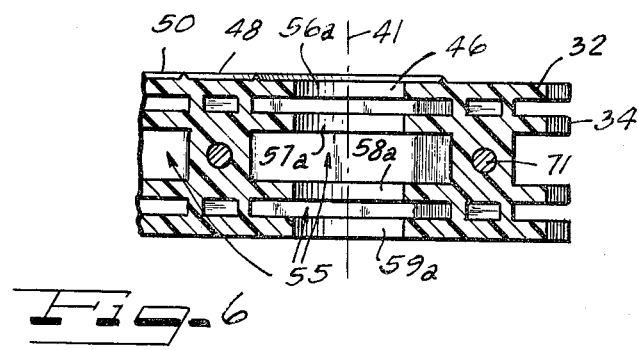

SEALING MEMBER FOR CABLE INLETS

RELATED APPLICATION

The present application is a continuation-in-part of application Ser. No. 584,522, filed June 6, 1975, abandoned with the filing hereof.

BACKGROUND OF THE INVENTION

1. Field of the Invention

The present application relates to devices for sealing against gas leakage through a space outwardly of a cable or cables as they pass into a cable housing.

2. The Prior Art

Cables have been sealingly inserted into cable fittings in different ways. For example, a sealing socket divided along a plane transverse to the axis of the cable receives a plastic sealing tape wound about the cable and bounded on both axial sides by synthetic disks. The cable and seal is then inserted into the sealing shell of a sealing chamber. The socket parts are screwed together, distributing the compound of the sealing tape reliably about the inlet. Very great closing forces must, however, be developed, and the sealing compound is not readily limited to the sealing chamber.

In another example, two highly elastic sealing plates are described in the German published application No. 2,235,415 as sealing elements for a pressure resistant cable head. A passage opening through the sealing plates is somewhat smaller than the cable, and the sealing plates are slipped over the end of the cable sheathing. German published application No. 1,958,155 discloses a sealing member having a double socket having several lips in one embodiment and a labyrinth in another. In both cases the seal is accomplished only by the abutment of the disks or lips, respectively; they are pressed against the cable only by the elastic forces of the material. Uneven areas in the cable sheathing frequently lead to leaks in such devices.

The Gillemot U.S. Pat. No. 3,827,704 shows a cable seal filled with a potting compound with selected grommets and adapter grommets and plugs employed to fill the spaces about the cables to be joined. The grommets are each slit lengthwise on one side to permit elastic assembly and attachement about the cable.

SUMMARY OF THE INVENTION

An annular sealing member has an axis and comprises at least two spaced-apart disk members each coaxial with and extending transversely of an axis of the member. A reinforcing member extends between the disk members and has a continous annular periphery. A central portion of the reinforcing member is apertured. The disk members and the reinforcing member together are divided into at least two sealing member portions on a plane extending parallel to the axis of the sealing member and through the central portion of the reinforcing member. Threaded bolts and sockets selectively connect the portions of the sealing member together across the plane and about the central portion of the reinforcing member. Thus the member may be bored through along the plane to form a desired semi-circular, ribbed recess in each of the sealing member portions for clamping about a cable to form the desired gas-tight seal. Four disk members may be provided, in two pairs each adjacent a respective first or second side of the sealing member.

A recess is preferbly formed at the intersection of one outer, axial face of the sealing member at its intersection with the dividing plane for guiding a boring tool for forming a cable opening therethrough of any selected size. A raised circular ridge may be provided on the same face of the sealing member to mark a maximum diameter of the cable opening formable therethrough with respect to the position of the reinforcing member. The reinforcing member further may have more than one central portion which may be bored through to form a cable passage, and the sealing member may be divided into more than two sealing member portions.

THE DRAWINGS

FIG. 2 is an axial, plan view of another form of sealing member, bored through in one locaton and showing in phantom the reinforcing member within the structure.

FIG. 3 is a side plan view of the structure of FIG. 2.

FIG. 5 is a top plan view of a central sealing member portion, taken on line V—V of FIG. 2.

FIG. 6 is a sectional view taken on line VI—VI of FIG. 2.

THE PREFERRED EMBODIMENTS

Figure 1:
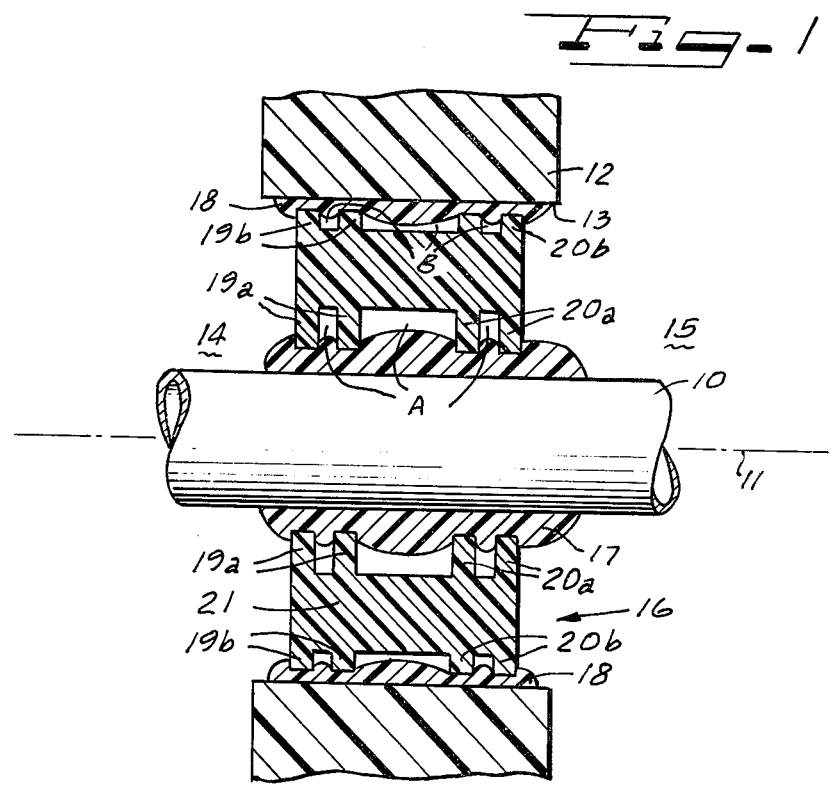
FIG. 1 is a cross-sectional view through a sealing member installed about a cable and within an entrance to a cable sleeve.

A completed installation of a cable through a cable inlet sealing member is shown in FIG. 1. A cable 10 having a longitudinal axis 11 passes through a cable inlet fitting 12 having an internal annular surface 13. The cable 10 is held in position with respect to the inlet fitting 12 and is sealed against passage of gas or other fluid from one zone 14 to another zone 15 therealong by a sealing member 16 combined with first and second layers 17, 18 of a plastic potting compound applied respectively about the cable and the inward surface 13 of the inlet fitting 12. In accordance with the principles of the invention, the sealing member 16 is ribbed on both radially inward and radially outward portions thereof by ribs 19a, 20a; 19b, 20b, respectively. Any number of ribs may be used, but an even number is preferred. Annular spaces A and B are formed among the ribs 19a, 20a; 19b, 20b, respectively, into which the plastic sealing compound 17, 18 is forced upon assembly of the sealing member 16 about the cable 10 and within the cable fitting 12. Such assembly will somewhat compress gases trapped within the spaces A, B, to improve the seal provided between the zones 14, 15. Further, the effective sealing length along the sealing member 16 is increased by the sealing compound 17, 18 adhering to the ribs thereof. As further shown in FIG. 1, the ribs 19, 20 are connected together axially of the sealing member by an integral reinforcement member 21 extending thereamong and axially of the member 16. Since the inner and outer ribs are radially aligned, these ribs may be referred to as disks, such disks including the common portions of the reinforcement member 21.

The principles of the invention are further shown in FIGS. 2 through 6, wherein a multiple-cable inlet sealing member is shown. In FIG. 2, a sealing member 30 is comprised of three sealing member portions —an upper portion 31, a central portion 32, and a lower portion 33. The sealing member 30 is shown in a circular form, although any other geometric shape could be provided or employed, so long as an outer periphery 34 of the sealing member 30 is closely fitted with an interior surface of a cable inlet fitting with which the member 30 is to be employed. The sealing member portions 31, 32, 33 are divided on respective planes 35, 36 and are adapted to be bored through along any of several cable axes 37, 38, 39, 40, 41 which lie in the planes 35, 36 as shown. Thus none of the cable axes 37–41 need coincide with an axis 42 of the circular sealing member 30, as was the axis 11 common to both the calbe 10 and the sealing member 16 in FIG. 1.

A recess 45 is preferably provided about each of the cable axes 37–41 to assist in guiding a boring tool used to sever a cable opening, as at 46 about the cable axis 41. A raised circular ridge 47, 48, 49, 50, 51 formed coaxially with each cable axis 37, 38, 39, 40, 41, respectively, is provided to mark a maximum diameter of aperture which may be bored through the sealing member 30 in each of the respective locations.

As shown in phantom in FIG. 2, and in side and sectional views in other figures, a reinforcement member 55 is formed integrally with the sealing member portions 31, 32, and 33 of the sealing member 30. The reinforcement member 55 is formed integrally with the disk or rib members 56, 57, 58 and 59 shown in FIG. 3 as comprising the sealing member 30. As shown in the axial view of FIG. 2, the reinforcement member 55 has a continuous outer periphery 60 and a series of apertures 61, 62, and 63 formed therein radially outwardly of the outermost marking ridges 48, 50, and 51 of the member 30. Having the walls of the apertures 61, 62, and 63 spaced radially outwardly from the maximum cable bore formable within each aperture assures that interior ribs 56a, 57a, 58a, and 59a will remain after boring to accept a plastic potting compound in the manner shown in FIG. 1. The outer periphery 34 of the sealing member 30, comprising surfaces of ribs 56b, 57b, 58b, and 59b, is spaced outwardly of the outer circumference 60 of the reinforcement member 55 also to be pressed into a plastic potting compound as in FIG. 1.

The reinforcement member 55 is adapted to receive a plurality of connection means including threaded bolts 65 passed therethrough to secure the sealing member portions 31, 32, and 33 together across the dividing planes 35 and 36. The upper and lower sealing member portions 31 and 33 are each formed with a plurality of bosses 66 each having an upper abutment surface 67 extending parallel to the dividing plane 35, 36 and an aperture 68 formed therein. Each bolt 65 has a head 69 and a shaft 70, the shaft being threaded at least on a lower portion 71 thereof. Corresponding portions of the reinforcement member 55 in the center sealing member portion 32 are formed with enlarged bosses 75 each having a threaded bore 76 therein for threadable engagement with the bolts 65. The head 69 of each bolt 65 is engageable with a tool, as a wrench or socket wrench, for turning to align and clamp the flange 67 of one portion of the reinforcement member 55 together with the threaded bore 76 of the other, adjacent portion.

Figure 4:
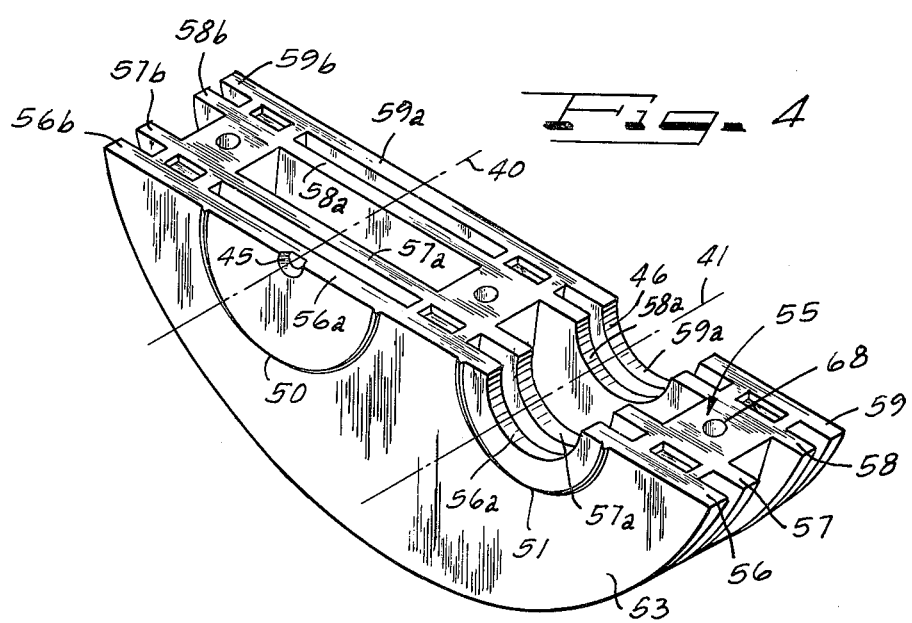
FIG. 4 is a perspective view of the lowermost sealing member portion after separation of the portions along line IV—IV of FIG. 2.

As depicted in FIG. 4, each portion 31, 32, 33, of the sealing member 30 is conveniently molded in a separate piece of hard synthetic material. Where the sealing member is to be in substantially circular form as installed, each of the portions thereof may be slightly reduced in transverse dimensions to allow for a thin layer of plastic sealing or potting compound along the dividing planes 35, 36, so that after assembly thereof the outer periphery 34 will be substantially circular. In FIG. 4, the lower sealing portion 33 is shown after a cable bore 46 has been formed therethrough, together with the center portion 32, along one cable axis 41. The bore 46 through the inner rib portions 56a, 57a, 58a, 59a is sufficient to pass a cable of a corresponding diameter therethrough. Since the axis 41 for the cable and the bore 46 lie on the plane 36, the sealing member portion 33 is readily fitted about one half of the cable for clamping thereto during an assembly process.

As indicated in FIG. 4, not all of the cable inlet positions must be used, since sealing between the inner and outer regions along the cable, 14 and 15 in FIG. 1, is effected by the uncut-out portions of the ribs at that location.

In use, the sealing member portions 31, 32, and 33 of the sealing member 30 in the embodiment of FIG. 2 through 6 are attached together by means of the bolts 65 before they leave the manufacturing facility. Once the proper size and configuration of sealing member 30 is selected, depending on the size and number of cables to be accommodated and the size and configuration of cable sleeve inlet to be used, the user will bore appropriate cable openings through the member 30 along any of the cable axes 37–41. On the dividing plane 35, either the boring tool guide recess 45 about the central cable axis 38, or one or both of the recesses 45 about the offset cable axes 37, 39 will be employed. One or both of the other cable axes 40, 41 may also be bored through for passage of a cable.

Once the appropriate cable bores have been formed, then the cable is inlet to the cable fitting to a desired position. The portions of the cables in the mouth or inlet of the cable sleeve, together with the interior of the opehing of the cable sleeve, are coated with a plastic potting compound. The mating surfaces along the dividing planes 35, 36 among the sealing member portions 31, 32, 33 are also coated with the plastic potting compound. Then the sealing member portions 31, 32, and 33 are assembled in proper position with each other about the cables with the dividing planes 35, 36 well sealed by the potting compound. Depending upon the potting compound employed, the bolts 69 may either be inserted directly through the compound through the apertures 68 and threaded portion 76, or the portions of the compound forming plugs in the apertures may be punched out and removed prior to such insertion. Clamping the sealing member portions 31 and 32 together, and 32 and 33 together by tightening the bolts 69 into the threaded sleeves 76 squeezes the potting compound about the cables forms a tight seal between opposite sides of the sealing member, with some of the potting compound forced into the interior, ribbed spaces A to improve the seal obtained. Then the sealing member and cables are inserted into the cable sleeve opening and set into the plastic potting compound applied thereabout. Again, the plastic sealing compound is forced into the spaces B to improve the seal effected.

Although various minor modifications may be suggested by those versed in the art, it should be understood that we wish to embody within the scope of the patent warranted hereon all such modifications as reasonably and properly come within the scope of our contribution to the art.

We claim as our invention:

1. An annular sealing member having an axis and comprising:

at least two rigid, spaced-apart disk portions each coaxial with and extending transversely of said axis of the sealing member;

a rigid reinforcing portion extending between said disk members, having a continuous annular periphery about said axis, and being apertured through at least one central portion;

the disk portions and reinforcing portion together being divided into at least two separate sealing member portions on a plane extending substantially parallel to said axis of the sealing member and through the central portion of the reinforcing portion; and bolt means for selectively connecting the portions of the sealing member together across said plane and about said central portion of said reinforcing portion, whereby the sealing member may be bored through at said plane to form a desired semi-circular, ribbed recess in each of said sealing member portions, the sealing member portions being clampable about a cable to form a gas-tight seal along said cable at a cable inlet fitting into which the seal member and cable are inserted.

2. An annular sealing member as defined in claim 1, wherein the member comprises four said disk portions, two of which are spaced adjacent a first side of the sealing member and two others of which are spaced adjacent a second side of the sealing member.

3. A sealing member as defined in claim 1, wherein one of said disk portions forms an end surface of said sealing member, and formed in said surface on an intersection thereof with said dividing plane is at least one recess means for guiding a boring tool forming a cable opening through said member.

4. A sealing member as defined in claim 3, wherein three recess means are provided along said plane and in said surface.

5. A sealing member as defined in claim 3, wherein a raised circular ridge is provided on said end surface coaxially with said recess means, the ridge marking a maximum diameter of a cable bore opening formable therethrough with respect to the reinforcement member.

6. A sealing member as defined in claim 1 wherein the bolt means comprise:

a pair of apertured, shouldered bosses in the reinforcement portion in a first one of the sealing member portions;

a pair of threaded sockets in the reinforcement, portion in an adjacent, second one of said sealing member portions, each socket being in alignment with one of the apertures in the bosses of the first sealing member portion; and a pair of bolt members each having a shaft engageable in one of said threaded sockets and a head engageable upon the boss about the corresponding aperture therein.

7. A sealing member as defined in claim 1, wherein said reinforcement portion has at least two apertures formed in said central portion, for use in sealing a plurality of cables.

8. A sealing member as defined in claim 7, wherein said disk portions and said reinforcement portion together are divided into three sealing member portions at two planes, each of said planes passing through one of said apertures of said reinforcement portion.

9. A sealing member as defined in claim 1, wherein said disk portions have co-cylindric outer peripheries and the annular periphery of said reinforcement portion is spaced radially inwardly of said peripheries of said disk portions.

10. A sealing member having an axis and an outer circumference and adapted to be received in a cable inlet fitting with at least one cable to be passed therethrough on a cable axis, the member comprising:

a plurality of rigid, longitudinally spaced-apart ribs each extending transversely of said member axis;

a rigid annular reinforcement portion formed integrally with and extending longitudinally among the ribs, the reinforcement portion surrounding and being spaced radially outwardly from said cable axis and radially inwardly of said outer circumference of the member;

said sealing member being longitudinally divided into a plurality of separate sealing member portions through said ribs and said reinforcement portion on a plane parallel to its axis and including the cable axis; and said sealing member further comprising a plurality of screw connection means for engaging between said reinforcement portions of adjoining sealing member portions and attaching the sealing member portions together across said dividing plane, whereby selected portions of the ribs on the cable axis may be bored through to a desired cable opening diameter and coated with a potting compound to seal the cable against passage of gas past said sealing member.

11. A sealing member having an axis and an outer circumference, the member being receivable in a cable inlet fitting, adapted to be bored through longitudinally, substantially parallel to said axis, to form at least one cable bore along a cable axis, and being divided on a plane including said cable axis into at least two separable sealing member portions, the member comprising:

a plurality of longitudinally spaced-apart, rigid ribs extending transversely to said outer member circumference;

a rigid annular reinforcement portion formed integrally with and extending longitudinally among the ribs radially outwardly of each said cable axis and cable bore and spaced inwardly of the outer circumference of the member, thereby leaving unconnected rib portions extending radially inwardly and outwardly of the reinforcement portion; and a plurality of transversely-extending screw clamping means for connecting said sealing member portions together.

* * * * *